March 17, 1925.  1,530,453
F. G. WILSON
ROLLER BEARING
Filed Nov. 27, 1922  2 Sheets-Sheet 1
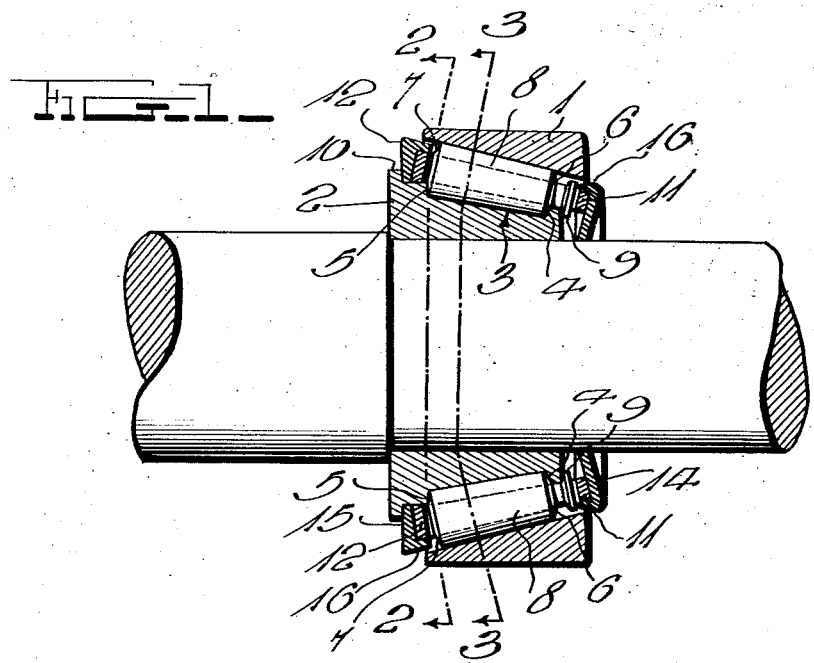
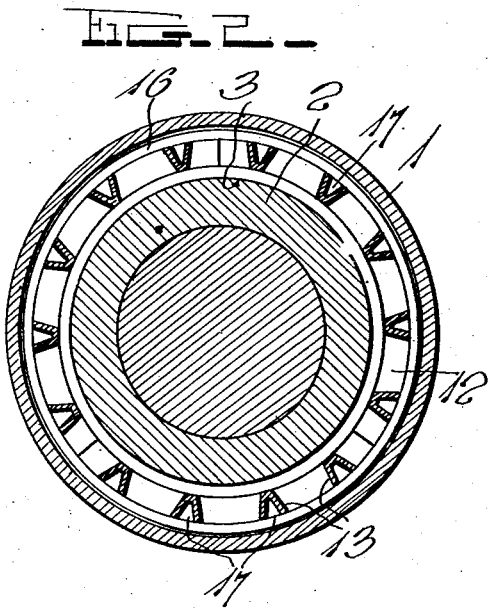
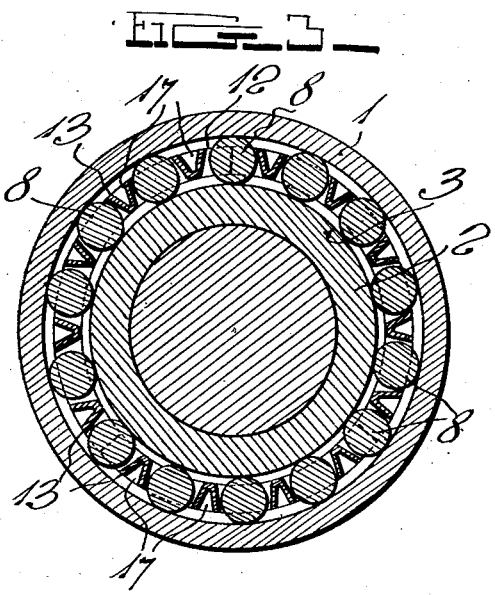
Witness
H. Woodard
Inventor
F. G. Wilson
By H. B. Wilson & Co.
Attorney March 17, 1925. 1,530,453

F. G. WILSON

ROLLER BEARING

Filed Nov. 27, 1922  2 Sheets-Sheet 2

Inventor
F. G. Wilson
By H. B. Wilson & Co.
Attorneys

Witness
H. Woodard

Patented Mar. 17, 1925.

1,530,453

UNITED STATES PATENT OFFICE.

FRED G. WILSON, OF JAMAICA, NEW YORK.

ROLLER BEARING.

Application filed November 27, 1922. Serial No. 603,624.

*To all whom it may concern:*

Be it known that I, FRED G. WILSON, a citizen of the United States, residing at Jamaica, Long Island, in the county of Queens and State of New York, have invented certain new and useful Improvements in Roller Bearings; and I do declare the following to be a full, clear, and exact description of the invention, such as will enable others skilled in the art to which it appertains to make and use the same.

My invention relates to improvements in roller bearings and has for its object to improve upon the construction disclosed in my U. S. Patent No. 1312936 of August 12, 1919.

One object of the invention is to provide improved means for securing the end rings of the segmental cage in place so as to properly hold the cage segments in assembled relation with each other.

A further object is to provide a bearing which may be easily and inexpensively manufactured and marketed, yet one which will be highly efficient and reliable.

With the foregoing in view, the invention resides in the novel subject matter hereinafter described and claimed, the description being supplemented by the accompanying drawings.

Figure 1 is a sectional view of the bearing cut in a common plane with its axis.

Figures 2 and 3 are transverse sectional views as indicated by lines 2—2 and 3—3 of Fig. 1.

Figure 4:
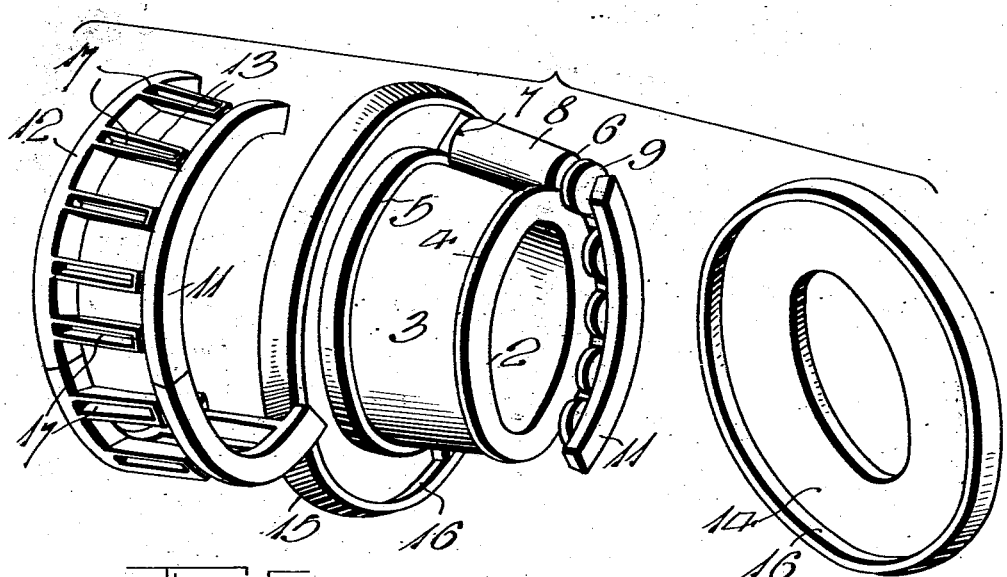
Figure 4 is a disassembled perspective view.
Figure 5:
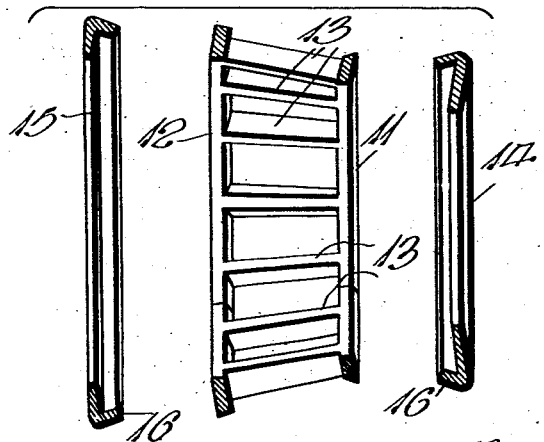
Figure 5 is a sectional view of the cage and one form of reinforcing rings in readiness for assemblage when said rings are heated to slip over the end rings of the cage.
Figure 7:
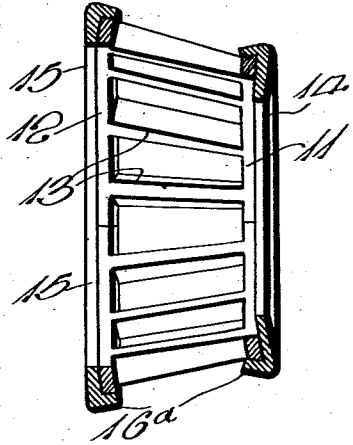
Figure 7 is a sectional view showing the reinforcing rings of Fig. 6 spun or pressed into place upon the cage.

In the drawings above briefly described, the numerals 1 and 2 designate outer and inner bushing members whose adjacent faces are preferably tapered so that the bushing member 2 is in the form of a cone whose large end is adapted to abut against some stop shoulder on the shaft upon which it is mounted. The inner face of the bushing 1 is straight throughout its width but the periphery of the cone 2 is provided with a circumferential groove 3 whose edge walls constitute shoulders 4 and 5 to abut the beveled ends 6 and 7 respectively of the bearing rollers 8. In the preferred form of construction, each roller is reduced beyond the shoulder 6 and is provided with a peripheral end flange 9 to abut the smaller end of the cone. The larger end of this cone is provided with an outstanding shoulder 10 spaced from the shoulder 5 for a purpose to appear.

Figure 6:
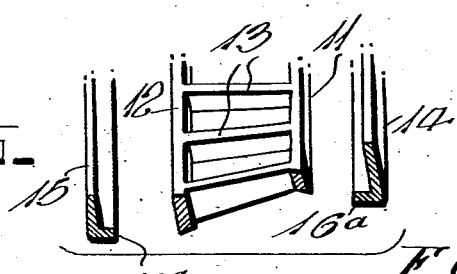
Figure 6 is a view similar to Fig. 5 but showing a different form of reinforcing rings.

A segmental cage is provided for the rollers 8 and as here shown, this cage is constructed of segmental end rings 11 and 12 and roller-spacing bars 13 connecting the segments of one of these rings with the corresponding segments of the other ring. The outer peripheral edges of these rings are beveled inwardly toward each other so that they are nearer to the axis of the cage at the inner sides of said rings, than at the outer sides thereof. A pair of one-piece reinforcing rings 14 and 15 are applicable to the outer sides of the end rings 11 and 12 and one of these rings is adapted to abut the shoulder 10 of the cone 2. The reinforcing rings 14 and 15 are provided with lateral flanges 16 which snugly embrace the end rings of the cage to secure their segments together and these flanges 16 may either be shrunk around the rings 11 and 12 or they may be spun or pressed into tight contact with the beveled edges thereof. In the form of construction shown in Figs. 1 to 5, the flanges 16 are machined on their inner sides to conform to the external bevel of the end rings 11 and 12, and the rings 14 and 15 are heated so that said flanges 16 are expanded and may easily be slipped over the end rings 11 and 12 to snugly engage the same when cooled. In Fig. 6, however, the flanges 16ª of the rings 14 and 15 are such that they may be easily slipped over the segmental end rings without heating and may therefore be spun or pressed into contact with the beveled edges of said end rings. Either method of attaching the rings 14 and 15 may be employed but I prefer to shrink them around the segmental end rings 11 and 12.

The outer sides of the roller-spacing bars 13 are formed with longitudinal channels 17 forming grease pockets. When the bearing is grease-covered, these pockets are filled with grease and when the bearing is in use, if its main supply of lubricant is consumed and the bearing heats slightly, the grease will melt and run from the pockets 17 so that injury to the bearing is prevented.

It will be understood that while the preferred forms of construction have been illustrated, numerous minor changes may be made. For instance, it will be seen that the rollers 8 need not be of the precise formation and proportions shown, that the connecting bars for the end rings of the cage may be of any desired cross sectional shape, and that the grease pockets 17 may be of any desired cross section and size.

I claim:

1. A roller bearing comprising a series of rollers, a segmental cage for said rollers having segmental end rings whose outer peripheral edges are beveled inwardly toward each other, and reinforcing rings having peripheral flanges surrounding said end rings and provided with beveled inner sides snugly contacting with said beveled peripheral edges of the end rings.

2. A roller bearing comprising a series of rollers, a segmental cage for said rollers having segmental end rings whose outer peripheral edges are beveled inwardly toward each other, and reinforcing rings having peripheral flanges shrunk on said end rings and provided with beveled inner sides snugly contacting with said beveled peripheral edges of the end rings.

In testimony whereof I have hereunto affixed my signature.

FRED G. WILSON.